(12) United States Patent
Kats et al.

(10) Patent No.: US 12,333,051 B1
(45) Date of Patent: Jun. 17, 2025

(54) SYSTEMS AND METHODS FOR VERIFYING SOCIAL MEDIA ACCOUNTS TO PREVENT IDENTITY-BASED ATTACKS ON SOCIAL MEDIA PLATFORMS

(71) Applicant: GEN DIGITAL INC., Tempe, AZ (US)

(72) Inventors: Daniel Kats, Culver City, CA (US); Daniel Marino, Los Angeles, CA (US)

(73) Assignee: Gen Digital Inc., Tempe, AZ (US)

( * ) Notice: Subject to any disclaimer, the term of this patent is extended or adjusted under 35 U.S.C. 154(b) by 499 days.

(21) Appl. No.: 17/520,145

(22) Filed: Nov. 5, 2021

(51) Int. Cl.
 G06F 21/62 (2013.01)
 G06Q 50/00 (2024.01)
 H04L 9/00 (2022.01)
 H04L 9/32 (2006.01)

(52) U.S. Cl.
 CPC ......... *G06F 21/6263* (2013.01); *G06Q 50/01* (2013.01); *H04L 9/3247* (2013.01); *H04L 9/50* (2022.05)

(58) Field of Classification Search
 None
 See application file for complete search history.

(56) References Cited

U.S. PATENT DOCUMENTS

| | | | | |
|---|---|---|---|---|
| 11,625,730 | B2 * | 4/2023 | Liu | G06N 20/00 |
| | | | | 705/318 |
| 11,788,852 | B2 * | 10/2023 | Nagpal | H04L 9/3297 |
| | | | | 701/424 |
| 2019/0349372 | A1 * | 11/2019 | Smith | G06F 21/31 |
| 2023/0046907 | A1 * | 2/2023 | Brosnan | G06Q 20/20 |

OTHER PUBLICATIONS

Edgerly et al., "The Blue Check of Credibility:Does Account Verification Matter When Evaluating NewsonTwitter?", Cyberpsychology, Behaviour, and Social Networking, vol. 22, No. 4, Apr. 18, 2019, pp. 283-287.

Kozlov et al., "Evaluating Changes to Fake Account Verification Systems", 23rd International Symposium on Research in Attacks, Intrusions and Defenses, Oct. 2020, pp. 135-148.

* cited by examiner

*Primary Examiner* — Rachel J Hackenberg
*Assistant Examiner* — Emad Siddiqi
(74) *Attorney, Agent, or Firm* — Greenberg Traurig, LLP

(57) ABSTRACT

The disclosed computer-implemented method for verifying social media accounts to prevent identity-based attacks on social media platforms may include (i) detecting identity data for an owner of a set of auxiliary social media accounts on a group of client devices, (ii) verifying, a core social media account, based at least in part on the detected identity data, (iii) linking the auxiliary social media accounts to the core social media account, (iv) signing a social media post originating from a linked auxiliary social media account by storing a unique identification of the social media post as a record on a publicly readable permissioned ledger (e.g., a blockchain), and (v) performing a security action that prevents an identity-based attack against third parties accessing the social media post by confirming that the social media post is legitimate based on the record. Various other methods, systems, and computer-readable media are also disclosed.

20 Claims, 6 Drawing Sheets

SYSTEMS AND METHODS FOR VERIFYING SOCIAL MEDIA ACCOUNTS TO PREVENT IDENTITY-BASED ATTACKS ON SOCIAL MEDIA PLATFORMS

BACKGROUND

Users of social networks may often interact with others over multiple platforms. For example, a user may utilize multiple social media accounts to create, read, and/or reply to messages posted on a social networking service platform, a microblogging service platform, a media sharing service account, and/or a professional networking service account. As the number of users interacting with social media platforms has increased, so have the number of potentially damaging identity-based attacks carried out by malicious actors utilizing these platforms including, for example, social media impersonation and account takeover, resulting in instances of financial fraud, misinformation amplification, private information solicitations/phishing, fake or premature dissemination of company product information, and the creation of social confusion during real-world crises.

In an effort to address identity-based attacks, some social media platforms have implemented proprietary account verification methods to prevent accounts being utilized for malicious purposes. However, these traditional verification methods are only limited to a single platform and thus are ineffective against multi-platform attacks. For example, an attacker creating a fake celebrity account on a social media platform that is not utilized by the actual celebrity victim may exploit this account to deceive and carry out identity-based attacks against other platform users.

SUMMARY

As will be described in greater detail below, the present disclosure describes various systems and methods for verifying social media accounts to prevent identity-based attacks on social media platforms.

In one example, a method for verifying social media accounts to prevent identity-based attacks on social media platforms may include (i) detecting, by one or more computing devices, identity data for an owner of a set of auxiliary social media accounts on one or more client devices, (ii) verifying, by the one or more computing devices, a core social media account, based at least in part on the detected identity data, (iii) linking, by the one or more computing devices, the auxiliary social media accounts to the core social media account, (iv) signing, by the one or more computing devices, a social media post originating from at least one of the linked auxiliary social media accounts by storing a unique identification of the social media post as a record on a publicly readable permissioned ledger (e.g., a blockchain), and (v) performing, by the one or more computing devices, a security action that prevents an identity-based attack against third parties accessing the social media post, by confirming that the social media post is legitimate based on the record on the publicly readable permissioned ledger.

In some examples, the identity data may be detected by (i) identifying contemporaneous images in one or more files associated with the owner of the auxiliary social media accounts or (ii) identifying identity document data associated with the owner of the auxiliary social media accounts. In some embodiments, the core social media account may be verified by comparing the detected identity data to profile data associated with the owner of the auxiliary social media accounts to determine a match. In one embodiment, the client devices utilized for creating social media posts from the owner of the auxiliary social media accounts may also be registered with the core social media account to ensure that only these devices will be able to generate and/or attest to signed social media posts.

In some examples, the auxiliary social media accounts may be linked to the core social media account by (i) utilizing an open standard for access delegation (e.g., Open Authorization (OAuth)) to provide a secure delegated access to the auxiliary social media accounts from the core social media account or (ii) posting a one-time-use message to the auxiliary social media accounts requesting that the core social media account be granted control of the auxiliary social media accounts. In some embodiments, linking the auxiliary social media accounts may be linked to the core social media account may further include writing an entry representing the linked auxiliary social media accounts and the core social media account to the publicly readable permissioned ledger.

In some examples, the social media post may be signed by (i) verifying that the social media post originated from the owner of at least one of the auxiliary social media accounts, (ii) publishing a data record comprising a hash of the social media post to the publicly readable permissioned ledger, and (iii) linking the data record to the social media post. In one embodiment, an application programming interface (API) may be utilized to publish the data record to the publicly readable permissioned ledger. In some embodiments, the security action may be performed by (i) receiving a third-party request to view the social media post, (ii) checking the publicly readable permissioned ledger for the unique identification, and (iii) confirming that the social media post is legitimate based on the unique identification appearing in the publicly readable permissioned ledger.

In one embodiment, a system for verifying social media accounts to prevent identity-based attacks on social media platforms may include at least one physical processor and physical memory comprising computer-executable instructions and a set of modules that, when executed by the physical processor, cause the physical processor to (i) detect, by a detection module, identity data for an owner of a group of auxiliary social media accounts on one or more client devices, (ii) verify, by a verification module, a core social media account, based at least in part on the detected identity data, (iii) link, by a linking module, the auxiliary social media accounts to the core social media account, (iv) sign, by a signing module, a social media post originating from at least one of the linked auxiliary social media accounts by storing a unique identification of the social media post as a record on a publicly readable permissioned ledger (e.g., a blockchain), and (v) perform, by a security module, a security action that prevents an identity-based attack against third parties accessing the social media post, by confirming that the social media post is legitimate based on the record on the publicly readable permissioned ledger.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect identity data for an owner of a group of auxiliary social media accounts on one or more client devices, (ii) verify, a core social media account, based at least in part on the detected identity data, (iii) link the auxiliary social media accounts to the core social media account, (iv) sign a social media post originating from at least one of the linked auxiliary social media accounts by storing a unique identification of the social media post as a record on a publicly readable permissioned ledger (e.g., a blockchain), and (v) perform a security action that prevents an identity-based attack against third parties accessing the social media post, by confirming that the social media post is legitimate based on the record on the publicly readable permissioned ledger.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
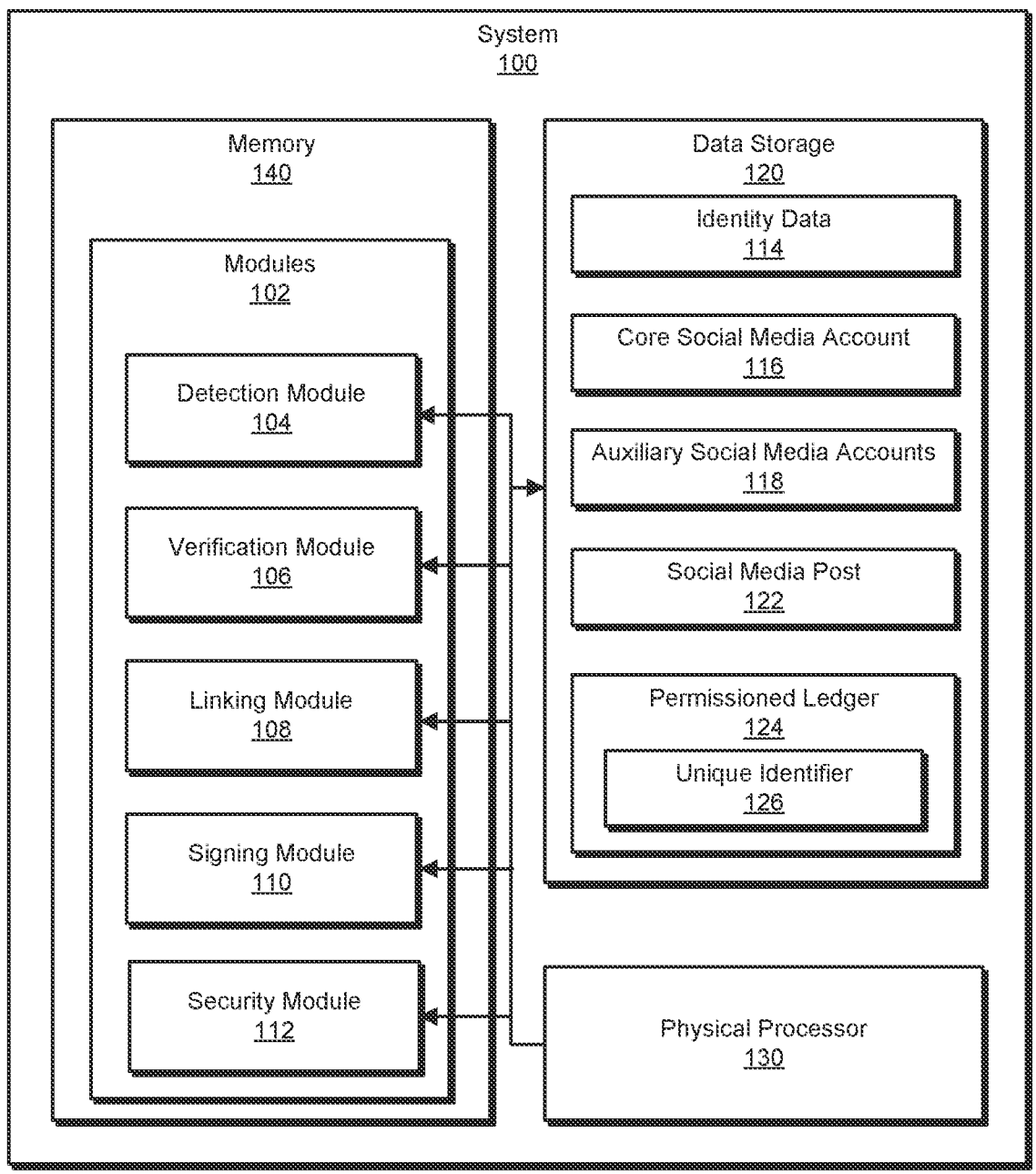
FIG. 1 is a block diagram of an example system for verifying social media accounts to prevent identity-based attacks on social media platforms.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for verifying social media accounts to prevent identity-based attacks on social media platforms. As will be described in greater detail below, the systems and methods described herein may utilize a platform-agnostic verification service including an account verification tool working in conjunction with a post signing tool that prevents identity-based attacks (e.g., account takeover and impersonation) on social media platforms. For example, the account verification tool may be utilized to create a "core" account that may be independently verified using real-world identity documents, contemporaneous photographs, and (optionally) the registration of user devices utilized for posting on social media platforms. Upon verification, the core account may be linked to multiple "auxiliary" accounts (e.g., a social networking service account, a microblogging service account, a media sharing service account, a professional networking service account, etc.) and posted to a publicly readable permissioned ledger (e.g., a publicly readable blockchain) or, alternatively, to a centralized data store. Additionally, the post signing tool may be utilized to store hashes (or unique identifications) of posts from core account holders that have been previously verified via publication on the ledger or data store. By utilizing the account verification tool and the post signing tool in this way, the systems and methods described herein may provide a single third-party source that unifies social media accounts on multiple platforms for verifying the legitimacy of posts (and flagging unverified posts) on these platforms and thereby prevent identify-based attacks, such as account takeover and account impersonation.

In addition, the systems and methods described herein may improve the field of computing device security by preventing identity-based attacks (e.g., attacks, financial fraud, the intentional spread of disinformation, etc.) against users of social media platforms by utilizing a platform-agnostic verification service.

Figure 2:
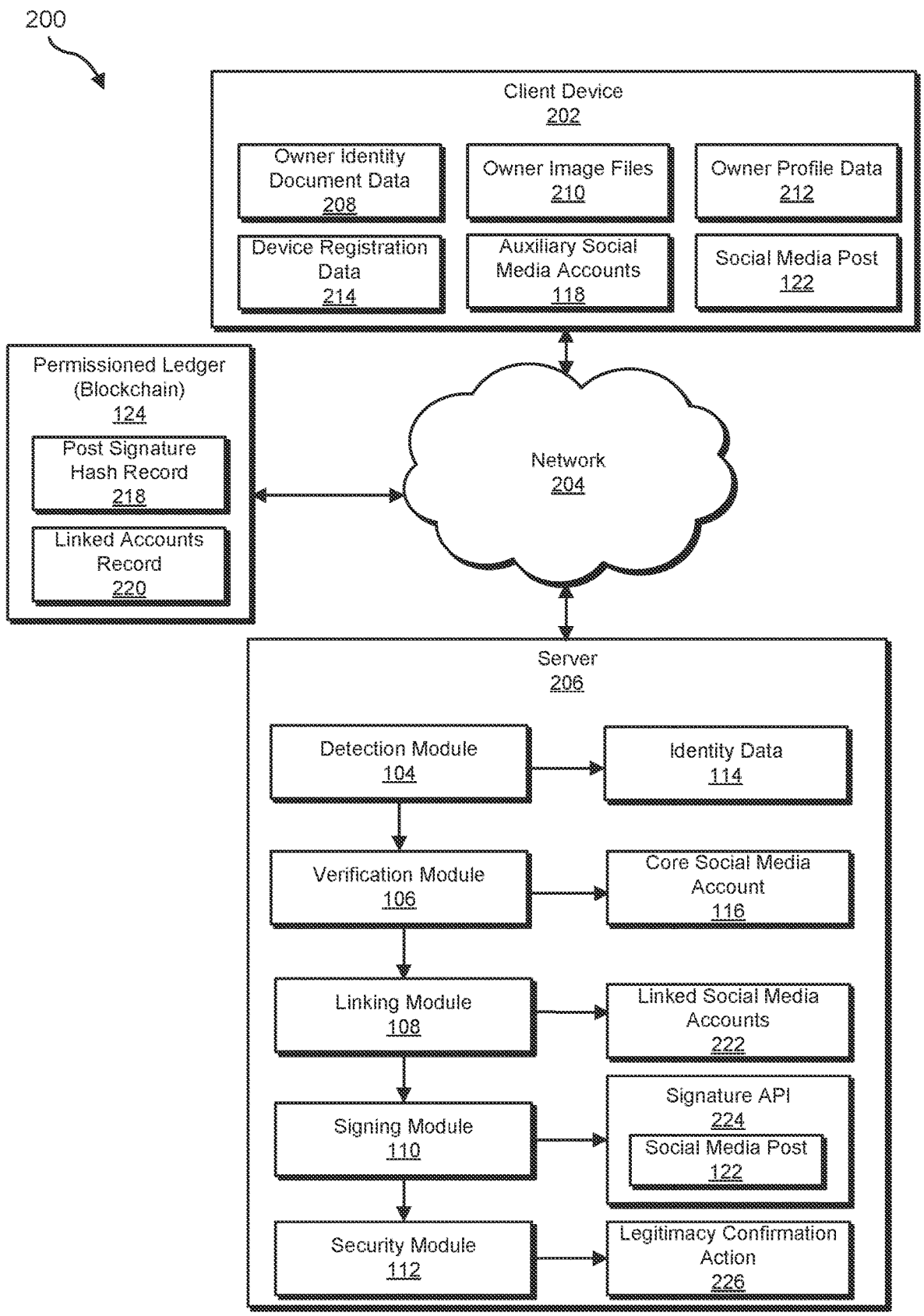
FIG. 2 is a block diagram of an additional example system for verifying social media accounts to prevent identity-based attacks on social media platforms.

The following will provide, with reference to FIGS. 1-2, detailed descriptions of example systems for verifying social media accounts to prevent identity-based attacks on social media platforms. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of an example system 100 for verifying social media accounts to prevent identity-based attacks on social media platforms. As illustrated in this figure, example system 100 may include one or more modules 102 for performing one or more tasks. For example, and as will be explained in greater detail below, example system 100 may include a detection module 104 that detects identity data 114 for an owner of auxiliary social media accounts 118 on one or more client devices. Example system 100 may additionally include a verification module 106 that verifies a core social media account 116, based at least in part on identity data 114. Example system 100 may also include a linking module 108 that links auxiliary social media accounts 118 to core social media account 116. Example system 100 may additionally include a signing module 110 that signs a social media post 122 originating from at least one of auxiliary social media accounts 118 by storing a unique identifier 126 of social media post 122 as a record on a permissioned ledger 124. Example system 100 may also include a security module 112 that performs a security action that prevents an identity-based attack against third parties accessing social media post 122 by confirming that social media post 122 is legitimate based on the record on permissioned ledger 124. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate verifying social media accounts to prevent identity-based attacks on social media platforms. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store identity data 114, core social media account 116, auxiliary social media accounts 118, social media post 122, and permissioned ledger 124 (which may store unique identifier 126).

Example system 100 in FIG. 1 may be implemented in a variety of ways. For example, all or a portion of example system 100 may represent portions of example system 200 in FIG. 2. As shown in FIG. 2, system 200 may include a client device 202 in communication with a server 206 via a network 204. In one example, all or a portion of the functionality of modules 102 may be performed by client device 202, server 206, and/or any other suitable computing system. As will be described in greater detail below, one or more of modules 102 from FIG. 1 may, when executed by at least one processor of client device 202 and/or server 206, enable client device 202 and/or server 206 to verify social media accounts to prevent identity-based attacks on social media platform.

For example, detection module 104 may detect identity data 114 (which may include owner identity document data 208 and/or owner image files 210) for an owner of auxiliary social media accounts 118, who may be identified by owner profile data 212, on client device 202. Next, verification module 106 may verify core social media account 116 based on identity data 114 and optionally device registration data 214 (stored on client device 202). Then, linking module 108 may link auxiliary social media accounts 118 to core social media account 116, which may be represented as linked social media accounts 222 and, in some embodiments, may be stored as a linked accounts record 220 on permissioned ledger 124. Next, signing module 110 may sign a social media post 122 (e.g., by utilizing signature API 224) originating from a linked auxiliary social media account 118 by storing a post signature hash record 218 (which may be representative of unique identifier 126) on permissioned ledger 124. Finally, security module 112 may perform a security action that prevents an identity-based attack against third parties accessing social media post 122 by executing a legitimacy confirmation action 226 to confirm that social media post 122 is legitimate based on post signature hash record 218 stored on permissioned ledger 124.

Client device 202 generally represents any type or form of computing device capable of reading computer-executable instructions. In some examples, client device 202 may be an endpoint device running client-side security software including social media account protection for owners who post from social media accounts on multiple social media platforms (e.g., via a web browser or by utilizing dedicated social media platform applications). Additional examples of client device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading and/or executing computer-executable instructions. In some examples, server 206 may be a security server that provides device threat protection services (including social media account protection) for various client devices over a network. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between client device 202, server 206, and permissioned ledger 124. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
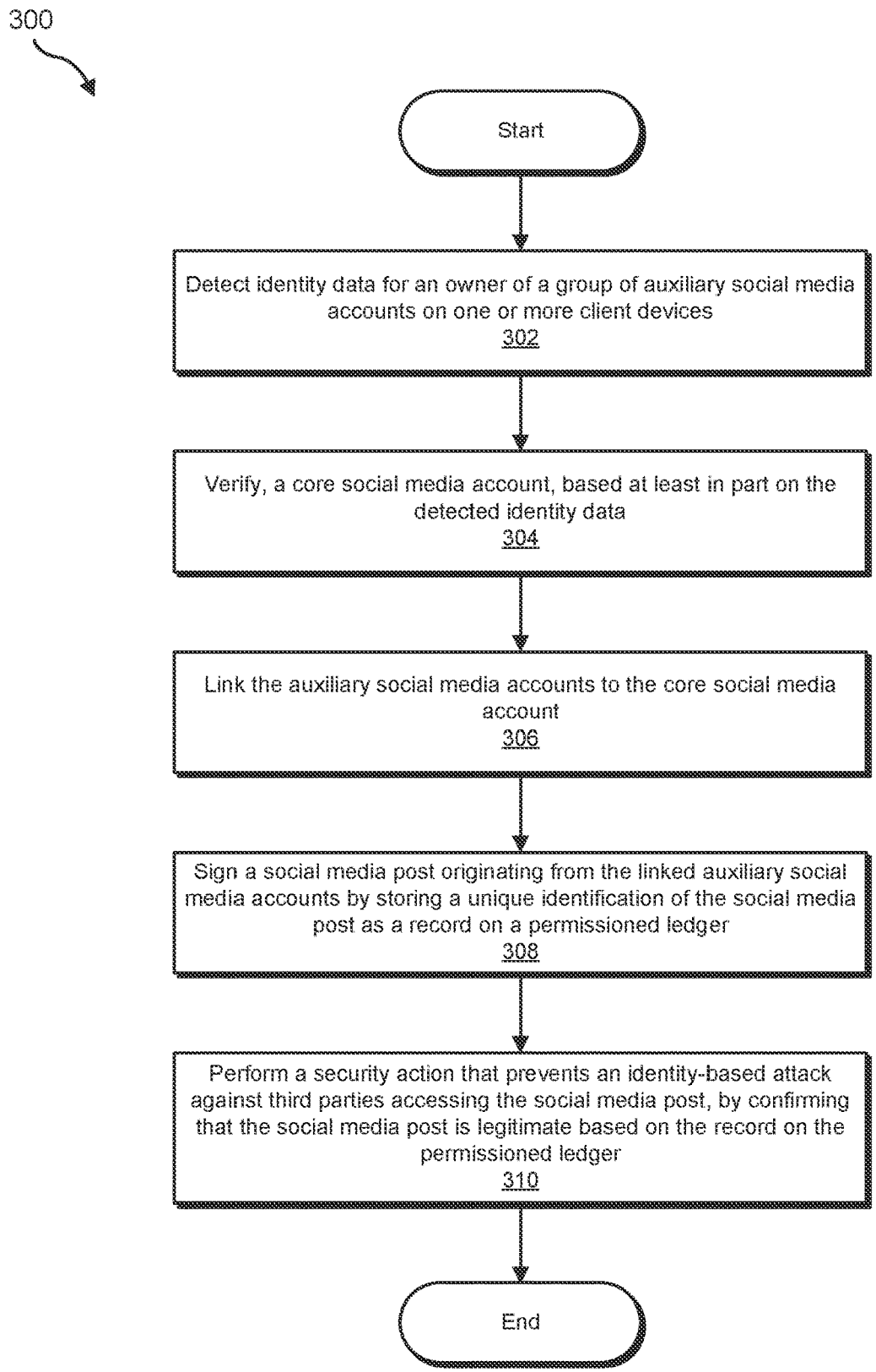
FIG. 3 is a flow diagram of an example method for verifying social media accounts to prevent identity-based attacks on social media platforms.

FIG. 3 is a flow diagram of an example computer-implemented method 300 for verifying social media accounts to prevent identity-based attacks on social media platforms. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect identity data for an owner of a group of auxiliary social media accounts on one or more client devices. For example, detection module 104 may, as part of server 206, detect identity data 114 for an owner of auxiliary social media accounts 118 on client device 202.

The term "auxiliary social media accounts," as used herein, generally refers to any of a number of social media accounts owned by a user and utilized for posting content (e.g., messages, images, etc.) on disparate social media service platforms that may be collectively linked to a single "core social media account." Example auxiliary social media accounts may include, without limitation, a social networking service account, a microblogging service account, a media sharing service account, and/or a professional networking service account. In some examples (and as will be described in greater detail herein), the core social media account may an account utilized by a verification service for controlling each of the auxiliary social media accounts.

Detection module 104 may detect identity data 114 in a variety of ways. In some examples, detection module 104 may identify contemporaneous images in owner image files 210 stored on client device 202. For example, detection module 104 may be configured to identify current or recent photographs of an owner of auxiliary social media accounts 118. Additionally or alternatively, detection module 104 may be configured to prompt the capture of self-portrait images (i.e., "selfies") of the owner in specific poses. Additionally or alternatively, detection module 104 may be configured to identify owner identity document data 208 (e.g., real-world identity documents such as a driver's license or passport). Additionally or alternatively, detection module 104 may be configured to identify biometric data identified with an owner of auxiliary social media accounts 118 on client device 202.

At step 304 one or more of the systems described herein may verify, a core social media account, based at least in part on the identity data detected at step 302. For example, verification module 106 may, as part of server 206 in FIG. 2, verify core social media account 116 based on identity data 114 and, optionally, device registration data 214 for client device 202.

Verification module 106 may send verify core social media account 116 in a variety of ways. In some examples, verification module 106 may compare detected identity data 114 (e.g., owner identity document data 208 and/or owner image files 210) to owner profile data 212 on client device 202 to determine a match. Then, upon determining the match, core social media account 116 may be verified and ready for linking with auxiliary social media accounts 118. In some embodiments, verification module 106 may also be configured to require registration of client device 202 (i.e., as a computing device configured to create social media posts) as device registration data 214.

At step 306 one or more of the systems described herein may link the auxiliary social media accounts to the core social media account. For example, linking module 108 may, as part of server 206 in FIG. 2, link auxiliary social media accounts 118 to core social media account 116 as linked social media accounts 222.

Linking module 108 may link auxiliary social media accounts 118 to core social media account 116 in a variety of ways. In some examples, linking module 108 may utilize an open standard for access delegation (e.g., the OAuth open standard) to provide secure delegated access to auxiliary social media accounts 118 from core social media account 116. Alternatively, linking module 108 may post a specific one-time-use message to an auxiliary social media account 118 (which may later be deleted) requesting that core social media account 116 be granted control of the auxiliary social media accounts 118. Additionally, linking module 108 may write an entry (e.g., linked accounts record 220) representing linked social media accounts 222 (i.e., core social media account 116 and auxiliary social media accounts 118) to permissioned ledger 124.

At step 308 one or more of the systems described herein may sign a social media post originating from the linked auxiliary social media accounts by storing a unique identification of the social media post as a record on a permissioned ledger. For example, signing module 110 may, as part of server 206 in FIG. 2, sign social media post 122 by storing post signing hash record 218 on permissioned ledger 124.

Signing module 110 may sign social media post 122 in a variety of ways. In some examples, signing module 110 may verify that social media post 122 originated from a legitimate social media account holder (e.g., the owner of core social media account 116). Then, signing module 110 may utilize signature API 224 to publish post signature hash record 218 to permissioned ledger 124. Finally, signing module 110 may link post signature hash record 218 to social media post 122. In some examples, signature API 224 may be utilized to both authenticate core social media account 116 and publish post signature hash record 218. Alternatively, in some embodiments, signing module 110 may be configured to monitor the social media feeds of core social media account owners and generate a notification that prompts the account owner to complete the signing process when a new post is detected.

In some examples, permissioned ledger 124 may be a publicly readable permissioned ledger (e.g., a blockchain) that may only be utilized by a service (e.g., an account verification and post signing service) or a trusted partner providing the systems and methods described herein. For example, only a service (or partner) may be permitted to write data to permissioned ledger 124. In this way, (e.g., by strictly controlling writes), the systems and methods described herein may ensure that sufficient identity verification is performed before identity-account links are written and adequate account owner authentication is performed before post signatures are written. Additionally, the use of a distributed ledger increases reliability and availability while making it publicly readable increases trustworthiness by establishing an immutable, auditable log of signature transactions. In alternative embodiment, a private centralized data store may be utilized instead of a distributed ledger. In yet another alternative embodiment, a publicly writable and readable ledger (e.g., a public blockchain) may be utilized. In this embodiment, each core social medial account holder would have their own public/private key pair. Blocks indicating identity verification and identity-account links would be signed the private key (with the possibility of allowing additional registered identity verification providers) while post signatures would be signed by the account holder's own private key.

At step 310 one or more of the systems described herein may perform a security action that prevents an identity-based attack against third parties accessing the social media post, by confirming that the social media post is legitimate based on the record on the permissioned ledger. For example, security module 112 may, as part of server 206 in FIG. 2, confirm that social media post 122 is legitimate based on post signature hash record 218 stored on permissioned ledger 124.

Figure 4:
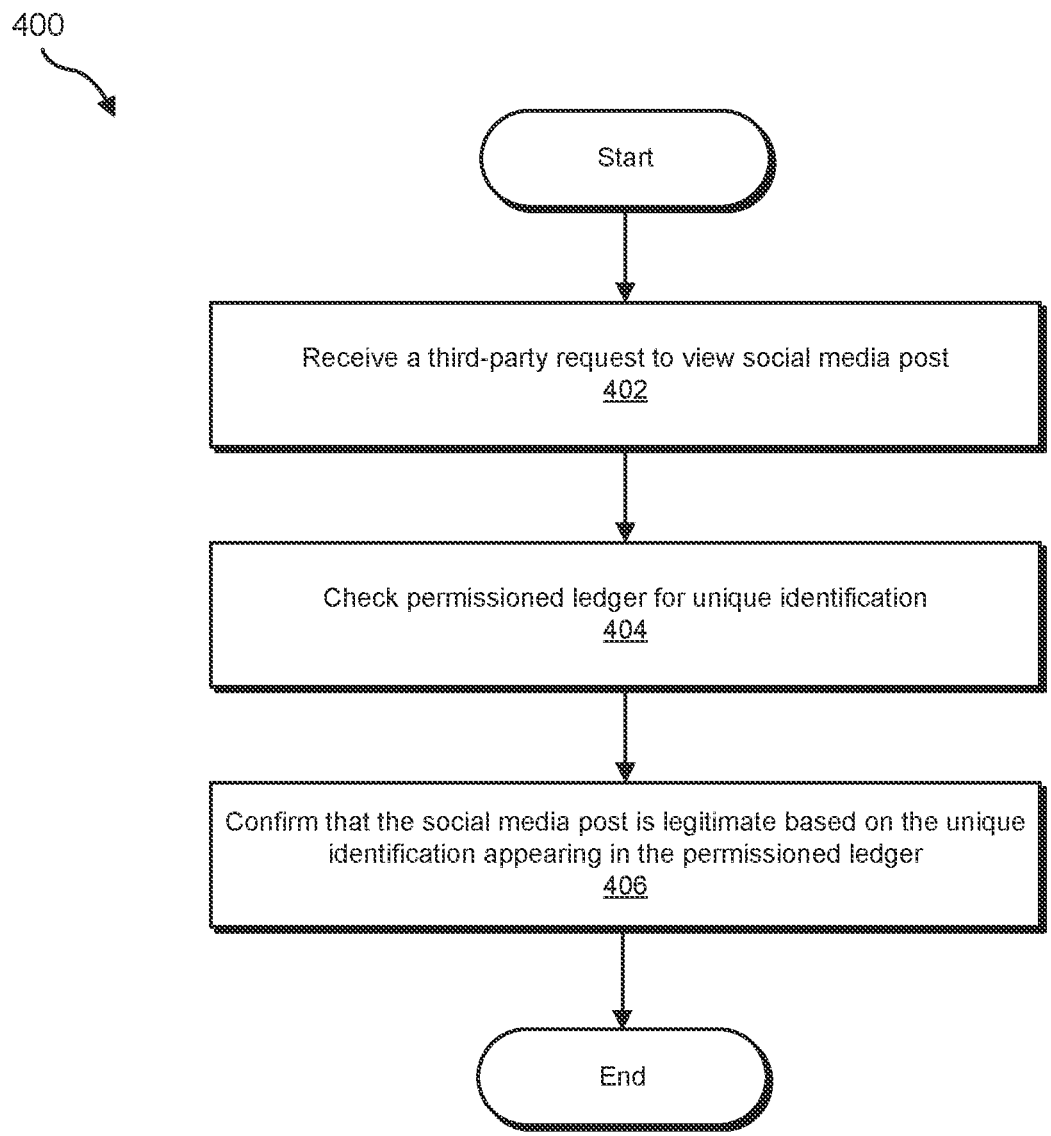
FIG. 4 is a flow diagram of an additional example method for verifying social media accounts to prevent identity-based attacks on social media platforms.

Security module 112 may confirm that social media post 122 is legitimate in a variety of ways which will now be described with respect to FIG. 4. Turning now to FIG. 4 is a flow diagram of an example computer-implemented method 400 is provided for verifying social media accounts to prevent identity-based attacks on social media platforms. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may receive a third-party request to view a social media post. For example, security module 112 may, as part of server 206 in FIG. 2, receive a request from a third-party client device to view social media post 122. Next, at step 404, one or more of the systems described herein may check a permissioned ledger for a unique identification. For example, security module 112 may, as part of server 206 in FIG. 2, check permissioned ledger 124 for post signature hash record 218 which is linked to social media post 122.

Finally, at step 406, one or more of the systems described herein may confirm that the social media post is legitimate based on the unique identification appearing in the permissioned ledger. For example, security module 112 may, as part of server 206 in FIG. 2, confirm that social media post 122 is legitimate based on post signature hash record 218 (which is linked to social media post 122) appearing in permissioned ledger 124.

As explained above in connection with method 300 above, the systems and methods described herein utilize a platform-agnostic verification service including an account verification tool working in conjunction with a post signing tool that prevents identity-based attacks (e.g., account takeover and impersonation) on social media platforms. For example, the account verification tool may be utilized to create a "core" account that may be independently verified using real-world identity documents, contemporaneous photographs, and (optionally) the registration of user devices utilized for posting on social media platforms. Upon verification, the core account may be linked to multiple "auxiliary" accounts (e.g., a social networking service account, a microblogging service account, a media sharing service account, a professional networking service account, etc.) and posted to a publicly readable permissioned ledger (e.g., a publicly readable blockchain) or, alternatively, to a centralized data store. Additionally, the post signing tool may be utilized to store hashes (or unique identifications) of posts from core account holders that have been previously verified via publication on the ledger or data store. By utilizing the account verification tool and the post signing tool in this way, the systems and methods described herein may provide a single third-party source that unifies social media accounts on multiple platforms for verifying the legitimacy of posts (and flagging unverified posts) on these platforms and thereby prevent identify-based attacks, such as account takeover and account impersonation.

Figure 5:
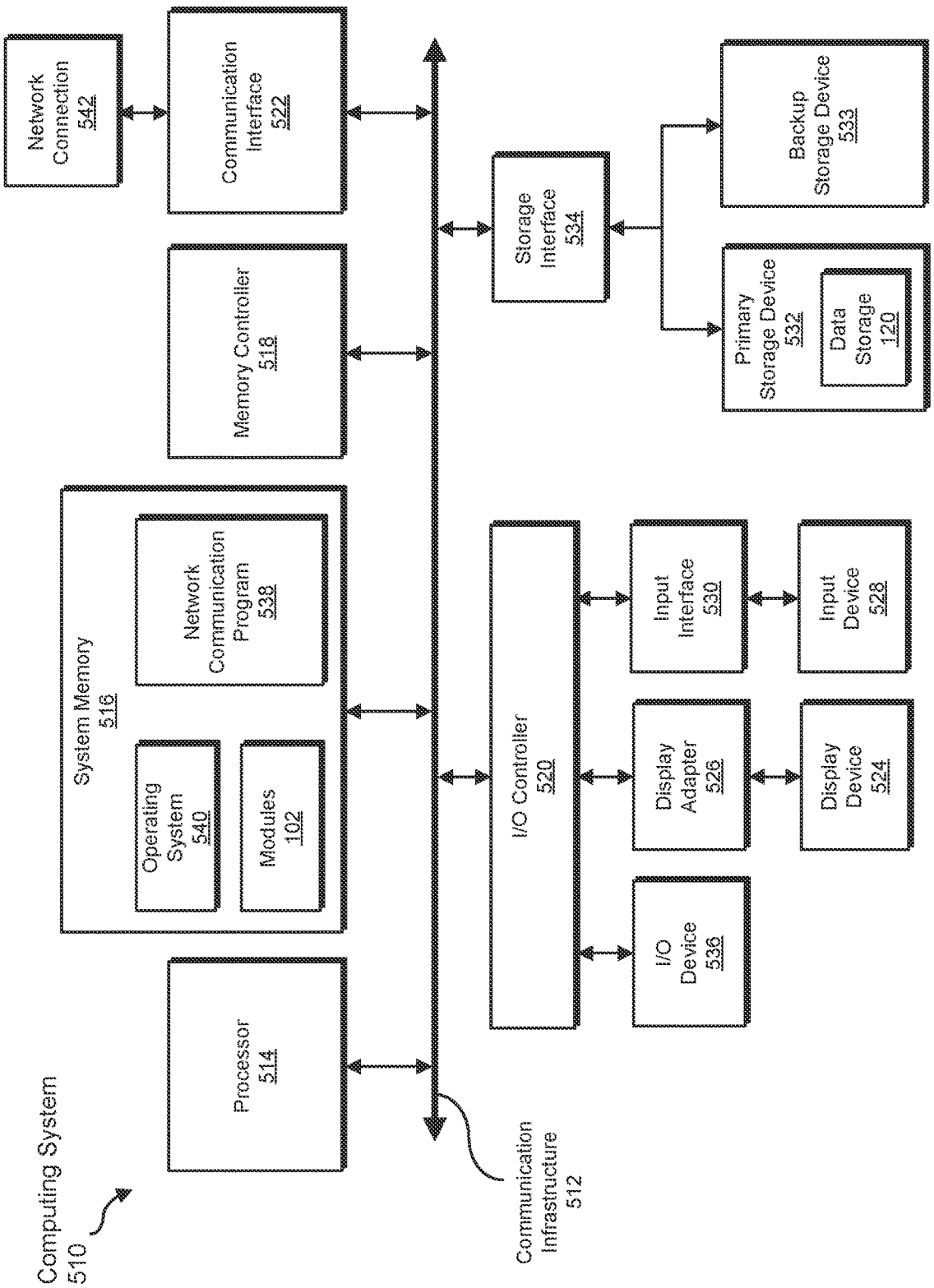
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data storage 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
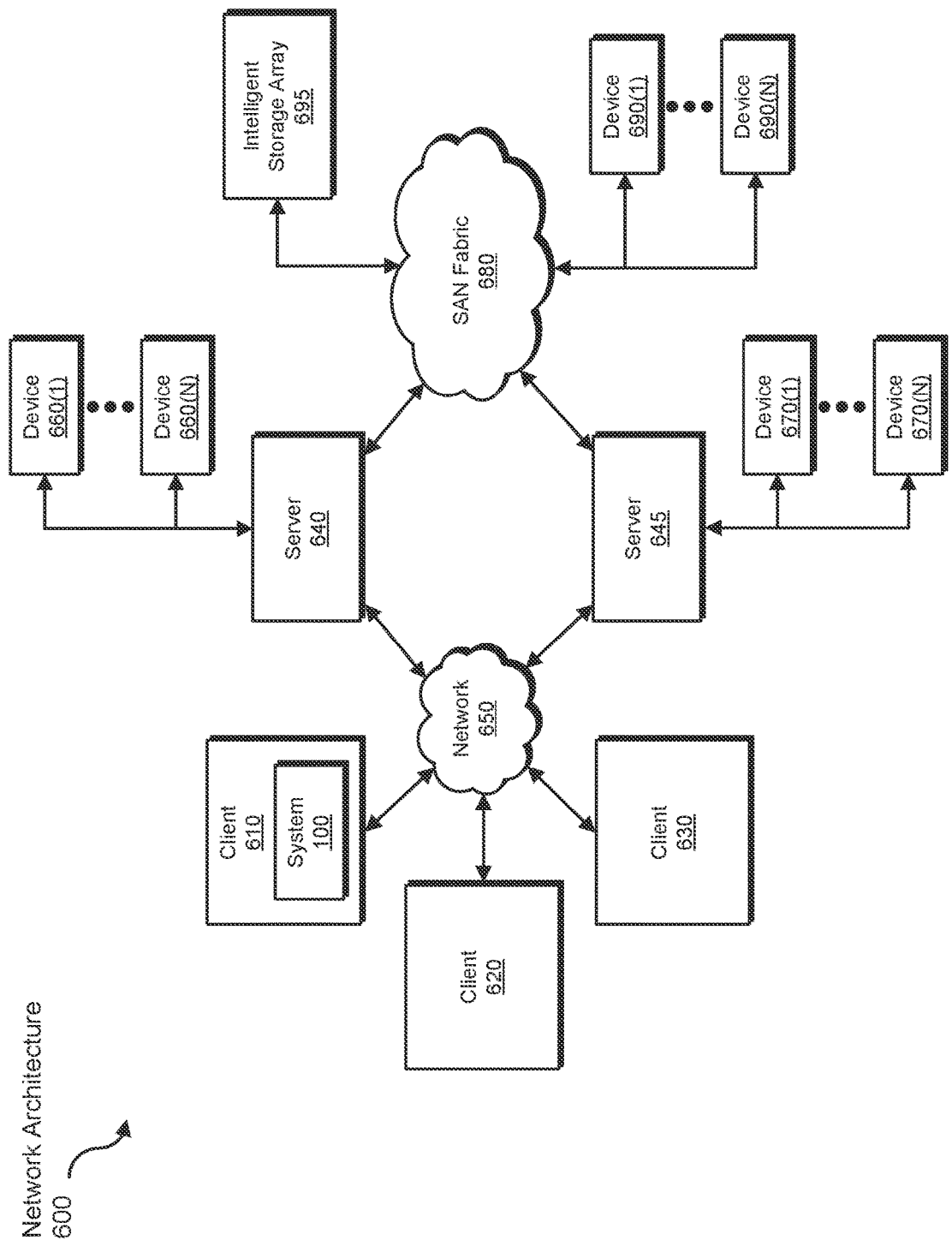
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for verifying social media accounts to prevent identity-based attacks on social media platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for verifying social media accounts to prevent identity-based attacks on social media platforms, at least a portion of the method being performed by one or more computing devices comprising at least one processor, the method comprising:
   detecting, by the one or more computing devices, identity data stored on one or more client devices for an owner of a plurality of auxiliary social media accounts;
   verifying, by the one or more computing devices, a core social media account, based at least in part on the detected identity data;
   linking, by the one or more computing devices, the auxiliary social media accounts to the core social media account by writing an entry representing the linked auxiliary social media accounts and the core social media account to a publicly readable permissioned ledger;
   signing, by the one or more computing devices, a social media post originating from at least one of the linked auxiliary social media accounts by storing a unique identification of the social media post as a record on the publicly readable permissioned ledger; and
   performing, by the one or more computing devices, a security action that prevents an identity-based attack against third parties accessing the social media post, by confirming that the social media post is legitimate based on the record on the publicly readable permissioned ledger.

2. The computer-implemented method of claim 1, wherein detecting the identity data comprises at least one of:
   identifying contemporaneous images in one or more files stored on the one or more client devices associated with the owner of the auxiliary social media accounts; or
   identifying identity document data stored on the one or more client devices associated with the owner of the auxiliary social media accounts.

3. The computer-implemented method of claim 1, wherein verifying the core social media account comprises comparing the detected identity data to profile data associated with the owner of the auxiliary social media accounts to determine a match.

4. The computer-implemented method of claim 3, further comprising registering the one or more client devices and storing device registration data on the one or more client devices, wherein verifying the core social media account is further based on the device registration data.

5. The computer-implemented method of claim 4, wherein the registered client devices are utilized to create social media posts from the owner of the auxiliary social media accounts.

6. The computer-implemented method of claim 1, wherein linking the auxiliary social media accounts to the core social media account comprises at least one of:
   utilizing an open standard for access delegation to provide a secure delegated access to the auxiliary social media accounts from the core social media account; or
   posting a one-time-use message to the auxiliary social media accounts requesting that the core social media account be granted control of the auxiliary social media accounts.

7. The computer-implemented method of claim 1, wherein signing the social media post comprises:
   verifying that the social media post originated from the owner of at least one of the auxiliary social media accounts;
   publishing a data record comprising a hash of the social media post to the publicly readable permissioned ledger; and
   linking the data record to the social media post.

8. The computer-implemented method of claim 7, wherein an application programming interface (API) is utilized to publish the data record to the publicly readable permissioned ledger.

9. The computer-implemented method of claim 1, wherein performing the security action comprises:
   receiving a third-party request to view the social media post;
   checking the publicly readable permissioned ledger for the unique identification; and
   confirming that the social media post is legitimate based on the unique identification appearing in the publicly readable permissioned ledger.

10. The computer-implemented method of claim 1, wherein an application programming interface (API) used to publish the record of the social media post on the publicly readable permissioned ledger is the same API used to verify the core social media account.

11. A system for verifying social media accounts to prevent identity-based attacks on social media platforms, the system comprising:
   at least one physical processor; and
   physical memory comprising computer-executable instructions and one or more modules that, when executed by the physical processor, cause the physical processor to:
     detect, by a detection module, identity data stored on one or more client devices for an owner of a plurality of auxiliary social media accounts;
     verify, by a verification module, a core social media account, based at least in part on the detected identity data;
     link, by a linking module, the auxiliary social media accounts to the core social media account by writing an entry representing the linked auxiliary social media accounts and the core social media account to a publicly readable permissioned ledger;
     sign, by a signing module, a social media post originating from at least one of the linked auxiliary social media accounts by storing a unique identification of the social media post as a record on the publicly readable permissioned ledger; and perform, by a security module, a security action that prevents an identity-based attack against third parties accessing the social media post, by confirming that the social media post is legitimate based on the record on the publicly readable permissioned ledger.

12. The system of claim 11, wherein the detection module detects the identity data by at least one of:

identifying contemporaneous images in one or more files stored on the one or more client devices associated with the owner of the auxiliary social media accounts; or identifying identity document data stored on the one or more client devices associated with the owner of the auxiliary social media accounts.

13. The system of claim 11, wherein the verification module verifies the core social media account by comparing the detected identity data to profile data associated with the owner of the auxiliary social media accounts to determine a match.

14. The system of claim 13, wherein the verification module further verifies the core social media account by registering the one or more client devices, storing device registration data on the one or more client devices, and uses the device registration data to verify the core social media account.

15. The system of claim 14, wherein the registered client devices are utilized to create social media posts from the owner of the auxiliary social media accounts.

16. The system of claim 11, wherein the linking module links the auxiliary social media accounts to the core social media account by at least one of:

utilizing an open standard for access delegation to provide a secure delegated access to the auxiliary social media accounts from the core social media account; or posting a one-time-use message to the auxiliary social media accounts requesting that the core social media account be granted control of the auxiliary social media accounts.

17. The system of claim 11, wherein the signing module signs the social media post by:

verifying that the social media post originated from the owner of at least one of the auxiliary social media accounts;

publishing a data record comprising a hash of the social media post to the publicly readable permissioned ledger; and linking the data record to the social media post.

18. The system of claim 17, wherein an application programming interface (API) is utilized to publish the data record to the publicly readable permissioned ledger.

19. The system of claim 11, wherein an application programming interface (API) used to publish the record of the social media post on the publicly readable permissioned ledger is the same API used to verify the core social media account.

20. A non-transitory computer-readable medium comprising one or more computer-executable instructions that, when executed by at least one processor of a computing device, cause the computing device to:

detect identity data stored on one or more client devices for an owner of a plurality of auxiliary social media accounts;

verify, a core social media account, based at least in part on the detected identity data;

link the auxiliary social media accounts to the core social media account by writing an entry representing the linked auxiliary social media accounts and the core social media account to a publicly readable permissioned ledger;

sign a social media post originating from at least one of the linked auxiliary social media accounts by storing a unique identification of the social media post as a record on a publicly readable permissioned ledger; and perform a security action that prevents an identity-based attack against third parties accessing the social media post, by confirming that the social media post is legitimate based on the record on the publicly readable permissioned ledger.

* * * * *